Nov. 8, 1960 M. E. BAILEY 2,959,599
ISOMERIZATION OF CYCLOHEXENE-1,2-DI-CARBOXYLIC ANHYDRIDES
Filed Nov. 19, 1956
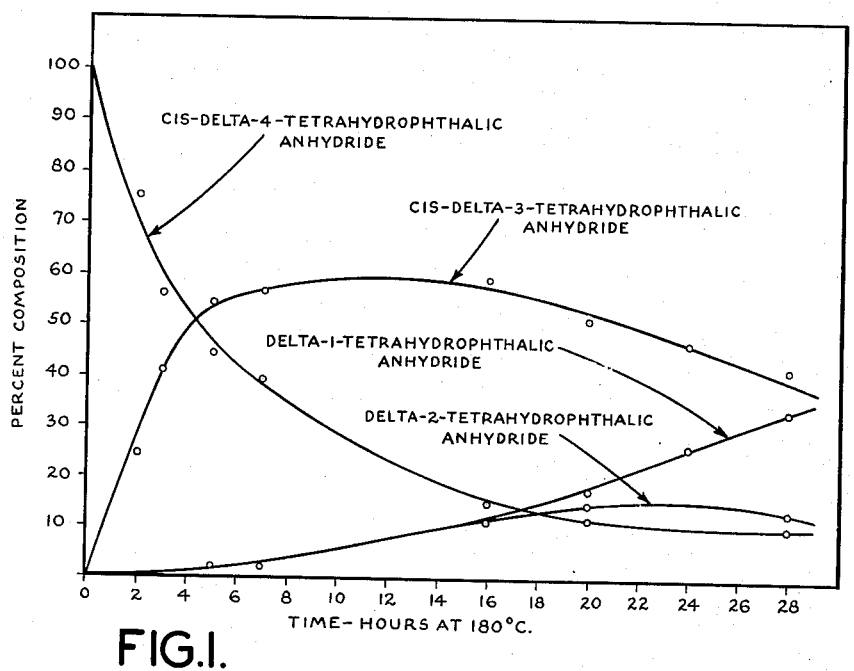
FIG.1.
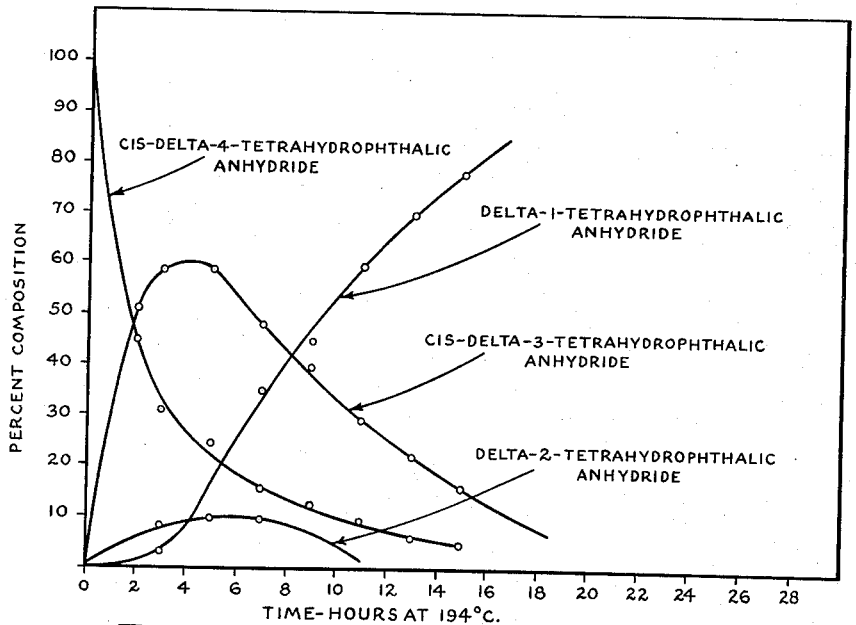
FIG.2.
INVENTOR
MAURICE E. BAILEY
BY
ATTORNEY

United States Patent Office 2,959,599
Patented Nov. 8, 1960

2,959,599
ISOMERIZATION OF CYCLOHEXENE-1,2-DICARBOXYLIC ANHYDRIDES

Maurice E. Bailey, Orchard Park, N.Y., assignor to Allied Chemical Corporation, a corporation of New York Filed Nov. 19, 1956, Ser. No. 623,252

3 Claims. (Cl. 260—346.3)

This invention relates to a process for isomerizing 4-cyclohexene-1,2-dicarboxylic anhydride and alkyl derivatives thereof by inducing a nuclear double bond shift. (As employed herein, including the claims, the term "4-cyclohexene-1,2-dicarboxylic anhydride" includes the cis and trans forms thereof.)

Because of the stability of the 4-cyclohexene isomer against a double bond shift, maleic anhydride-butadiene adducts have not been heretofore of utility in the synthesis of other isomeric forms of tetrahydrophthalic anhydride.

Since 4-cyclohexene-1,2-dicarboxylic anhydride and its lower derivatives are readily available at relatively low cost via Diels-Alder synthesis from 1,3-butadienes and maleic anhydride, my invention provides a novel and efficient method for producing the isomeric anhydrides, especially the 1-cyclohexene isomer.

The process of the present invention produces tetrahydrophthalic anhydride products which are liquid at ordinary temperatures and therefore susceptible to easier materials-handling procedures than are the solid isomers, such as 4-cyclohexene-1,2-dicarboxylic anhydride ($\Delta^4$-tetrahydrophthalic anhydride). Further, my process produces isomers which can be distilled without change (as contrasted with cis-4-cyclohexene-1,2-dicarboxylic anhydride, which undergoes changes in melting point and other properties at distillation temperature), thus making it possible to prepare products of high purity from raw materials of low purity (e.g. crude butadiene and maleic anhydride) as well as making possible the elimination of undesirable impurities which are formed when such raw materials react.

I have discovered that 4-cyclohexene-1,2-dicarboxylic anhydride and nuclear alkyl derivatives thereof can be isomerized via a double bond shift by a process which comprises heating them with small or catalytic amounts of a compound of the group consisting of phosphoric acid, sulfuric acid, their acid halides, acid salts and anhydrides. The term anhydrides of sulfuric acid and phosphoric acid includes compounds representing various degrees of dehydration of these acids down to the ultimate anhydrides $SO_3$ and $P_2O_5$, e.g. metaphosphoric acid, pyrophosphoric acid, pyrosulfuric acid, etc. Acid chlorides of these acids include, for example, phosphorus oxychloride, phosphorus pentachloride, and chlorosulfonic acid. Acid salts include acid-reacting salts of these acids, e.g. sodium bisulfate.

This discovery was surprising inasmuch as both phosphorus pentoxide and sulfuric acid in large amounts are known to undergo quite different reactions with 4-cyclohexene-1,2-dicarboxylic anhydride and its symmetrical derivatives. Thus, R. Ya Levine et al., Journal of General Chemistry, U.S.S.R., vol. 23, pt. 2 (1953)—page 2113 of the English translation, report that phosphorus pentoxide acts as a decarboxylating and dehydrogenating agent with 4-cyclohexene-1,2-dicarboxylic anhydrides yielding aromatic hydrocarbons. According to the teaching of U.S. Patent 2,551,575, concentrated sulfuric acid reacts with 4-cyclohexene-1,2-dicarboxylic anhydride to form a sulfonated product, 5-sulfo-4-cyclohexene-1,2-dicarboxylic anhydride. No isomerized anhydride was recognized, in either of the above publications, as resulting from the treatment with the phosphorus pentoxide and the sulfuric acid, respectively.

In the process of the present invention, temperatures used to effect the isomerization reactions vary with the particular catalyst employed and the compound to be isomerized, and in general range from about 70° C. to about 230° C. Temperatures above 230° C. are undesirable, since they cause the formation of excessive amounts of degradation products and colored products. With 4-methyl-4-cyclohexene-1,2-dicarboxylic anhydride, and probably other asymmetrically substituted derivatives of 4-cyclohexene-1,2-dicarboxylic anhydride, the isomerization reaction is sufficiently rapid in the lower range of temperatures; 4-cyclohexene-1,2-dicarboxylic anhydride and probably symmetrically substituted derivatives thereof isomerize less readily so that temperatures of about 150° C. or higher are desirable for accomplishing the isomerization of such compounds.

Preferably, the isomerization is carried out by heating the anhydride in the molten state, i.e. to a temperature above the melting point of the anhydride. However, the anhydride may be heated while dissolved in a suitable inert solvent, e.g. tetralin, under ordinary or superatmospheric pressure.

Phosphorus pentoxide, phosphorus oxychloride, concentrated sulfuric (100%) and chlorosulfonic acids are essentially equivalent in catalytic activity when used with unsubstituted 4-cyclohexene-1,2-dicarboxylic anhydride. 85% phosphoric acid and sodium acid sulfate are much less effective catalysts than the above, although in the less stringent requirements for isomerizing 4-methyl-4-cyclohexene-1,2-dicarboxylic anhydride this difference in effectiveness is not as evident as in the case of the symmetrical parent compound.

In general, it is desirable to employ at least about 0.1% by weight of catalyst based on the weight of anhydride, and preferably between about 0.5 and 2%. Catalyst concentrations appreciably over 2% do not add materially to the operating effectiveness of the process, and concentrations greater than about 10% are relatively uneconomical and may be expected to produce excessive amounts of by-products.

EXAMPLE 1

One thousand gram samples of cis-4-cyclohexene-1,2-dicarboxylic anhydride (solidification point 100° C.) were agitated with 10 grams of $P_2O_5$ at 180° C. and 194° C., respectively. Fifty grams of the mixture were withdrawn after various time intervals and distilled rapidly in vacuo at 150° C. Portions of distillate were dissolved in chloroform (5.00 grams/100 ml.) and their infra-red absorption spectra determined using a Baird spectrophotometer. Isomer concentrations were calculated by an application of Beer's law to the differences in absorption of the test specimen and a sample of the pure isomer (also dissolved in chloroform in a concentration 5 g./100 ml.) at selected wavelengths characteristic of the isomer evaluated. 1-cyclohexene-1,2-dicarboxylic anhydride was determined by measuring the absorbency of the band at 7.9 microns referred to a basing point at 7.7 microns; versus the band for the pure isomer; 2-cyclohexene-1,2-dicarboxylic anhydride by using the 8.9 micron band referred to a base line constructed tangent to the inflection points near 8.8 and 9.0 microns; 3-cyclohexene-1,2-dicarboxylic anhydride by using the 9.9 micron band referred to a base line tangent to the inflection points near 9.0 and 12.0 microns; and 4-cyclohexene-1,2-dicarboxylic anhydride by using the band at 10.1 microns referred to a basing point at 10.0 microns. Relative concentrations of the isomers versus time of heating are shown in Figures 1 and 2 of the accompanying drawing for the temperatures 180° C. and 194° C., respectively.

EXAMPLE 2

Six hundred grams of cis-4-cyclohexene-1,2-dicarboxylic anhydride were heated at 200° C. with 9 grams phosphorus pentoxide for 48 hours. The product was distilled at 5–9 mm. of Hg and 140–145° C. yielding 87 grams of tarry residue and 481 grams of solid distillate conforming essentially to the properties of pure 1-cyclohexene-1,2-dicarboxylic anhydride. Neutralization equivalent of the distillate=76.2; melting point=71–72° C.

EXAMPLE 3

Five samples of cis-4-cyclohexene-1,2-dicarboxylic anhydride were heated with phosphorus pentoxide under various conditions of catalyst concentration and temperature. Three samples were heated at 200° C. using 0.5, 1.0, and 1.5% of catalyst, respectively. Two were heated with 1.0% catalyst at temperatures of 170° C. and 230° C., respectively. The technique used in Example 1 for obtaining a sample representative of the progress of the reaction at various times by distillation of small portions of the reaction mixture, was employed here. Reactions were conducted until the solidification point of distillate samples thus obtained decreased from about 100° C. (for 4-cyclohexene-1,2-dicarboxylic anhydride) to a minimum of about 0° C. This condition was attained in 36 hours at 200° C. with 0.5% $P_2O_5$, in 5 hours at 200° C. with 1.0% $P_2O_5$, in 2 hours at 200° C. with 1.5% $P_2O_5$, in 1 hour at 230° C. with 1% $P_2O_5$ and in 84 hours at 170° C. with 1% $P_2O_5$.

EXAMPLE 4

Six hundred grams of cis-4-cyclohexene-1,2-dicarboxylic anhydride were heated at 200° C. for 18 hours with 6 grams of sulfuric acid. The product was vacuum distilled as above to yield 570 grams of distillate liquid at room temperature (20° C.) and 29 grams of residue. The neutralization equivalent of the distillate was 76.0.

EXAMPLE 5

100 gram samples of 4-methyl-4-cyclohexene-1,2-dicarboxylic anhydride (s.p. 62° C. obtained by Diels-Alder reaction of isoprene with maleic anhydride) were heated to 140° C. for 6 hours with 1% of various catalysts. The product of this treatment was then distilled at about 2 mm. pressure and the effectiveness of the catalyst judged by the character of the product: a lowering of the setting point indicating that the product was an isomer mixture. Results are given in the following table:

Table I

CATALYST EFFECTIVENESS IN 4-METHYL-4-CYCLOHEXENE-1,2-DICARBOXYLIC ANHYDRIDE REARRANGEMENT

| Catalyst | Setting Point of Product, °C. | Conclusion |
|---|---|---|
| No catalyst | 61 | Little or no isomerization. |
| $CCl_3COOH$ | 62 | Catalyst ineffective. |
| $H_2SO_4$ | ca 0 | Catalyst is effective. |
| $H_3PO_4$ | ca −8 | Do. |
| $P_2O_5$ | ca −5 | Do. |
| $CF_3COOH$* | +57 | Some isomerization. |
| $NaHSO_4$ | cloud pt. +11, +14; clear pt. +27 to 27.5. | Isomerization occurred. |
| Silica Gel | 60.8 | No isomerization. |

*This test was conducted under reflux but as no vapors were noted in the condenser, it is believed that $CF_3COOH$ formed a complex with the methyl-4-cyclohexene-1,2-dicarboxylic anhydride.

Besides the anhydrides specifically illustrated in the examples, the present invention can be similarly used to isomerize other alkyl and polyalkylated derivatives of 4-cyclohexene-1,2-dicarboxylic anhydrides obtainable by Diels-Alder addition of maleic anhydride with 1,3-butadienes substituted by one or more alkyl substituents.

I claim:
1. The method of inducing a nuclear double bond shift in a tetrahydrophthalic anhydride compound selected from the group consisting of 4-cyclohexene-1,2-dicarboxylic anhydride and the lower alkyl substitution derivatives thereof, which comprises heating the anhydride with 0.1% to 10% by weight of a compound of the group consisting of phosphoric acid, sulfuric acid, the anhydrides of sulfuric acid and of phosphoric acid, chlorosulfonic acid, phosphorus oxychloride, phosphorus pentachloride and sodium bisulfate at a temperature between 70° C. and 230° C.

2. The method of preparing a liquid mixture of isomeric cyclohexene-1,2-dicarboxylic anhydrides, which comprises heating 4-cyclohexene-1,2-dicarboxylic anhydride with 0.5% to 2% by weight of phosphorus pentoxide, at a temperature between 150° C. and 230° C.

3. The method of preparing a liquid mixture of isomeric cyclohexene-1,2-dicarboxylic anhydrides, which comprises heating 4-cyclohexene-1,2-dicarboxylic anhydride with 0.5% to 2% by weight of concentrated sulfuric acid at a temperature between 150° C. and 230° C.

References Cited in the file of this patent

UNITED STATES PATENTS 2,764,597    Barney _____ Sept. 25, 1956

OTHER REFERENCES

Beilstein: Vol. 17, pp. 461 and 462 (mainwork) (1933).

Von Baeyer: Annalen, vol. 258, pp. 145–219 (1890).